United States Patent [19]

Hayashi

[11] Patent Number: 5,243,881
[45] Date of Patent: Sep. 14, 1993

[54] CONTROL APPARATUS FOR CONTINUOUSLY VARIABLE TRANSMISSION CONNECTED TO LEAN-BURN ENGINE

[75] Inventor: Takashi Hayashi, Susono, Japan

[73] Assignee: Toyota Jidosha Kabushiki Kaisha, Toyota, Japan

[21] Appl. No.: 828,164

[22] Filed: Jan. 30, 1992

[30] Foreign Application Priority Data

Feb. 4, 1991 [JP] Japan ..................... 3-35513

[51] Int. Cl.$^5$ .......................................... F16H 9/18
[52] U.S. Cl. ..................... 74/856; 364/424.1; 424/12; 123/704
[58] Field of Search ............. 74/857, 856; 364/424.1; 474/12, 18; 123/704

[56] References Cited

U.S. PATENT DOCUMENTS

| | | | |
|---|---|---|---|
| 4,736,301 | 4/1988 | Osanai | 364/424.1 |
| 4,858,497 | 8/1989 | Kouno | 364/424.1 X |
| 4,964,318 | 10/1990 | Ganoung | 74/860 X |
| 4,982,822 | 1/1991 | Petzold et al. | 364/424.1 X |
| 5,011,458 | 4/1991 | Kumm | 474/49 |
| 5,042,325 | 8/1991 | Sawasaki et al. | 474/12 X |
| 5,092,198 | 3/1992 | Morishige et al. | 74/866 |

FOREIGN PATENT DOCUMENTS

| | | |
|---|---|---|
| 58-191358 | 11/1983 | Japan . |
| 29863 | 2/1984 | Japan ..................... 364/424.1 |
| 60-256662 | 12/1985 | Japan . |
| 60-256663 | 12/1985 | Japan . |
| 61-268845 | 11/1986 | Japan . |
| 62-242169 | 10/1987 | Japan . |
| 64-46062 | 2/1989 | Japan . |

OTHER PUBLICATIONS

SAE Technical Paper Series, No. 860652, pp. 1-8, Feb. 24-28, 1986, J. J. Main, "Ford Eltec Integrated Powertrain Control".

Primary Examiner—Leslie A. Braun
Assistant Examiner—Khoi Q. Ta
Attorney, Agent, or Firm—Oblon, Spivak, McClelland, Maier & Neustadt

[57] ABSTRACT

A control apparatus for controlling a motor vehicle having a continuously variable transmission having a pair of pulleys and a belt, and a lean-burn internal combustion engine operable in a plurality of burning conditions. This control apparatus includes an engine condition determining device for determining a currently established one of the burning conditions of the engine, and a pressure regulating device for controlling a belt tensioning pressure used to control the tension of the belt, based on an output torque of the engine, depending upon the currently established burning condition determined by the engine condition determining device.

10 Claims, 7 Drawing Sheets

CONTROL APPARATUS FOR CONTINUOUSLY VARIABLE TRANSMISSION CONNECTED TO LEAN-BURN ENGINE

BACKGROUND OF THE INVENTION

1. Field of the invention

The present invention relates to a control apparatus for controlling a motor vehicle having a lean-burn internal combustion engine and a hydraulically operated continuously variable transmission of belt-and-pulley type.

2. Discussion of the Prior Art

For controlling exhaust emission of a motor vehicle, a lean-burn internal combustion engine adapted for combustion of a fuel-lean air-fuel mixture is proposed in JP-A-61-268845. The lean-burn engine disclosed includes an EGR (Exhaust Gas Recirculation) valve, a swirl control valve for causing turbulent flows in the cylinders of the engine, and combustion control means for producing a fuel-lean air-fuel mixture whose air-fuel ratio is higher than the stoichiometric value ($A/F = 14.5$). This lean-burn engine has a plurality of burning conditions, one of which is selected depending upon a load being applied to the engine, so that the engine is operated with reduced amounts of HC, CO and NOx included in exhaust gases. An example of a belt-and-pulley type continuously variable transmission whose speed ratio is continuously variable is disclosed in JP-A-58-191358. The speed ratio of this continuously variable transmission is adjusted so that the internal combustion engine operates according to an optimum fuel consumption curve, assuring improved gas mileage of the vehicle. The above-described lean-burn internal combustion engine also exhibits a desirably high fuel economy due to significantly reduced pumping loss. Accordingly, it is proposed to install the lean-burn engine and continuously variable transmission on the motor vehicle, so as to assure further improved gas mileage of the vehicle.

In a continuously variable transmission having a pair of pulleys and a belt connecting the pulleys as proposed in Japanese Patent Application filed Feb. 1, 1990 in the name of the assignee of the present application, a belt tensioning pressure for controlling the tension of the belt is suitably regulated depending upon an input torque of the transmission, so as to maintain the tension of the belt at a required minimum level. For example, a suitable pressure regulating valve is actuated to produce an optimum belt tensioning pressure, which is determined based on the input torque of the transmission and the effective diameters of the pulleys engaging the belt. The input torque is calculated based on the engine speed and the opening angle of a throttle valve disposed in an intake pipe of the engine, while the effective diameters of the pulleys are calculated based on the current speed-ratio of the transmission. Where the above-described lean-burn engine and continuously variable transmission are both installed on the vehicle, however, the output torque of the engine (i.e., the input torque of the transmission) is inevitably varied depending upon the currently selected burning condition, even with the same engine speed and throttle opening angle. Thus, the known arrangement is incapable of optimally controlling the tension of the belt.

SUMMARY OF THE INVENTION

It is therefore an object of the present invention to provide a control apparatus for controlling a motor vehicle having a lean-burn internal combustion engine and a belt-and-pulley type continuously variable transmission, which apparatus is able to optimally control the tension of a belt of the transmission, irrespective of a currently selected burning condition of the engine.

The above object may be attained according to the principle of the present invention, which provides a control apparatus for controlling a motor vehicle having a hydraulically operated continuously variable transmission, and a lean-burn internal combustion engine operable in a plurality of burning conditions, the transmission including a pair of variable-diameter pulleys, a transmission belt connecting the pair of pulleys, and a pair of hydraulic actuators for changing effective diameters of the pulleys for continuously variably changing a speed ratio of the transmission, one of the pair of hydraulic actuators receiving a belt tensioning pressure for controlling a tension of the transmission belt, the control apparatus comprising: (a) engine condition determining means for determining a currently established one of the plurality of burning conditions of the lean-burn internal combustion engine; and (b) pressure regulating means for controlling the belt tensioning pressure based on an output torque of the engine, depending upon the currently established burning condition determined by the engine condition determining means.

In the control apparatus constructed according to the present invention, the pressure regulating means is adapted to regulate the belt tensioning pressure, based on the output torque of the engine, which is determined depending upon the currently established burning condition of the lean-burn engine that is determined by the engine condition determining means. Since the output torque of the lean-burn engine varies depending upon the burning condition of the engine, even with the same engine speed and engine load, the belt tensioning pressure is regulated so as to absorb a variation of the engine output torque due to a change in the burning condition of the engine.

With the belt tensioning pressure regulated in the manner as described above, the tension of the transmission belt can be precisely controlled to an optimum value, i.e., maintained at a required minimum level, while avoiding slipping of the belt on the pulleys, resulting in a minimum power loss in the transmission.

BRIEF DESCRIPTION OF THE DRAWINGS

The above and optional objects, features and advantages of the present invention will become more apparent by reading the following detailed description of a presently preferred embodiment of the present invention, when considered in conjunction with the accompanying drawings, in which.

DETAILED DESCRIPTION OF THE PREFERRED EMBODIMENT

Figure 1:
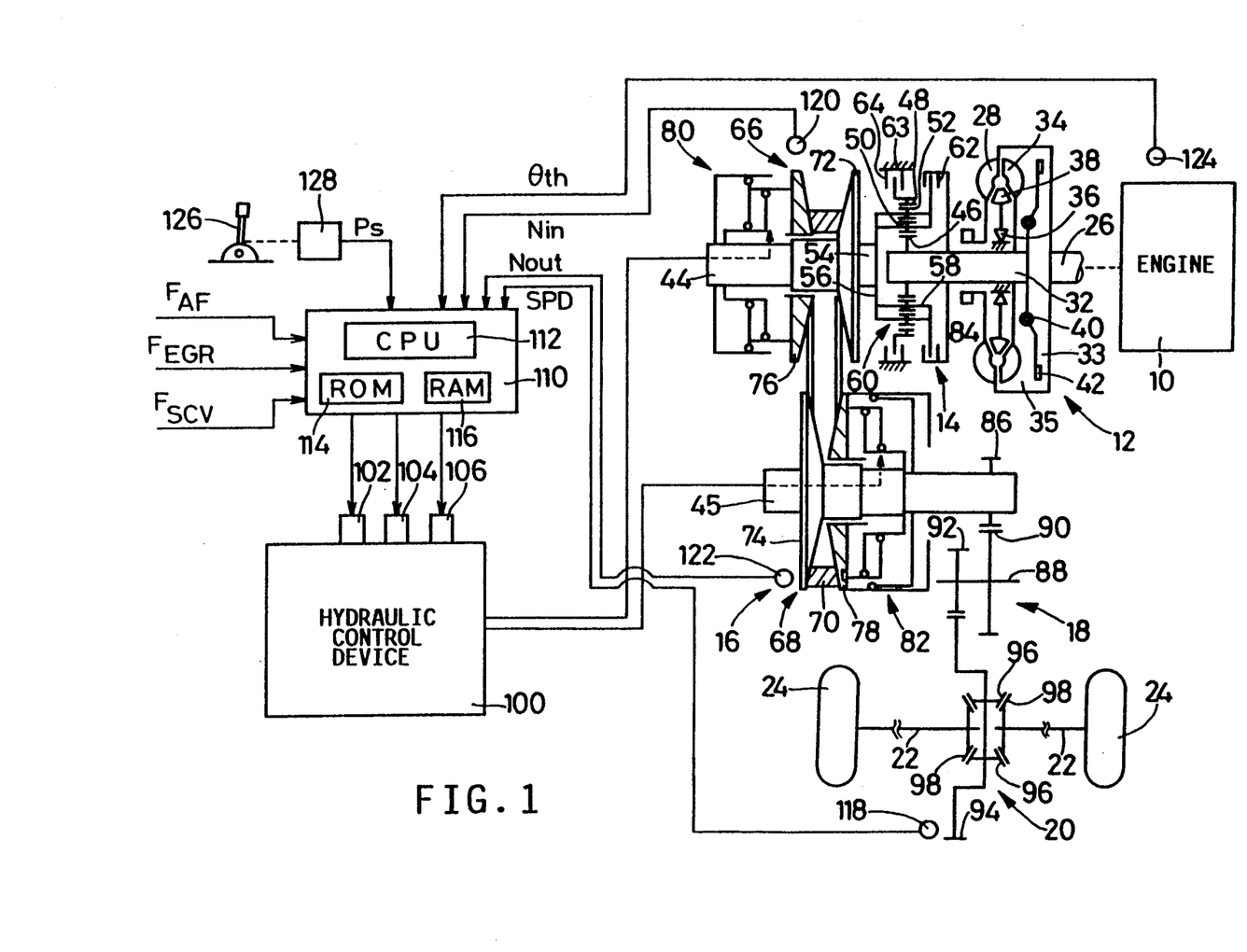
FIG. 1 is a schematic view of a vehicle power transmitting system including a continuously variable transmission, which is equipped with a hydraulic control device that is controlled by an electronic control apparatus constructed according to one embodiment of the present invention.

Referring first to FIG. 1, there is illustrated a power transmitting system of a motor vehicle, for transmitting power from an engine 10 to drive wheels 24. The power transmitting system includes a fluid torque converter 12 connected to the engine 10 and equipped with a lock-up clutch 42; a reversing gear mechanism in the form of a reversing device 14 connected to the torque converter 12, for selecting a forward or a reverse running of the vehicle; a continuously variable transmission (hereinafter referred to as "CVT") 16 connected to the reversing device 14; a reduction gear device 18 connected to the CVT 16; a differential gear device 20 connected to the reduction gear device 18; and drive axles 22 connected to the differential gear device 20 and drive wheels 24.

The fluid torque converter 12 includes a pump impeller 28 connected to a crankshaft 26 of the engine 10; a turbine impeller 34 which is fixed to an output shaft 32 of the converter 12 and which is rotated by means of a working fluid from the pump impeller 28; a stator impeller 38 which is fixed to a stationary member through a one-way clutch 36; and the lock-up clutch 42 indicated above, which is fixed to the output shaft 32 through a damper 40. The output shaft 32 of the converter 12 is located between the crankshaft 26 and a center shaft 54 of the reversing device 14, in coaxial relationship with these shafts 26, 54. The torque converter 12, which is filled with the working fluid, is adapted to transmit torque between the pump impeller 28 and the turbine impeller 34, to provide a desired ratio of the speeds of the crankshaft 26 and the output shaft 32, while the lock-up clutch 42 is disengaged or released. The torque converter 12 is operated to effect engagement of the lock-up clutch 42 for direct connection of the crankshaft 26 to the output shaft 32, when the speed of the vehicle, engine 10 or turbine impeller 34 exceeds a predetermined value.

The reversing device 14 is a well-known double-pinion type planetary gear mechanism, which is disposed coaxially with and between the output shaft 32 of the torque converter 12 and an input shaft 44 of the CVT 16, for selecting the forward or reverse running of the vehicle depending upon the currently selected operating position of a shift lever 126. This planetary gear mechanism includes: a sun gear 46 which is fixed on the output shaft 32 serving as an input shaft of the reversing device 14; a ring gear 48 disposed concentrically with the sun gear 46; a pair of planetary gears 50, 52 which mesh with the sun gear 46 and the ring gear 48, respectively, while meshing with each other; the center shaft 54 indicated above, which is disposed concentrically with the sun and ring gears 46, 48; and a carrier 60 including a flange 56 which extends radially outwards from the center shaft 54, and carrier pins 58 which extend from the flange 56 in the direction parallel to the axis of the center shaft 54 to rotatably support the planetary gears 50, 52. The reversing device 14 further includes a FORWARD clutch 62 for connecting the output shaft 32 of the torque converter 12 and the carrier 60, and a REVERSE brake 64 for connecting the ring gear 48 and a housing 63 for stopping the rotation of the ring gear 48.

The FORWARD clutch 62 and REVERSE brake 64 are hydraulically operated, frictionally coupling devices. When the FORWARD clutch 62 is engaged, the output shaft 32 of the torque converter 12 and the carrier 60 are connected to each other, whereby the center shaft 54 of the reversing device 14 is rotated with the output shaft 32, so as to run the vehicle in the forward direction. When the REVERSE brake 64 is engaged, on the other hand, the ring gear 48 is connected to the housing 63 so as to stop the rotation of the ring gear 48, whereby the direction of rotation of the center shaft 54 is reversed with respect to that of the output shaft 32 of the converter 12. Consequently, power is transmitted so as to run the vehicle in the reverse direction.

The CVT 16 includes a first and a second variable-diameter pulley 66, 68 which are provided on the input shaft 44 and an output shaft 45, respectively, and a transmission belt 70 for connecting these pulleys 66, 68. The belt 70 includes a multiplicity of blocks which are connected in series to form an endless annular hoop or chain, and which are pressed against walls of the pulleys 66, 68 which define respective V grooves, as disclosed in JP-A-61-116146 and JP-A-2-62445. The pulleys 66, 68 have respective stationary rotors 72, 74 fixed to the respective input and output shafts 44, 45, and respective axially movable rotors 76, 78 which are axially movable on the respective shafts 44, 45 and rotated with these shafts. The movable rotors 76, 78 are moved by respective first and second hydraulic actuators in the form of first and second hydraulic cylinders 80, 82, whereby the effective widths of the V grooves of the pulleys 66, 68, i.e., the effective diameters of the pulleys 66, 68 engaging the belt 70 are changed, to change a speed ratio "r" of the CVT 16 (Nin/Nout, where Nin=speed of the input shaft 44, and Nout=speed of the output shaft 45). While the first hydraulic cylinder 80 is operated primarily for changing the speed ratio "r" of the CVT 16, the second hydraulic cylinder 82 is operated primarily for adjusting the tension of the belt 70 to the smallest value within an optimum range in which the belt 70 does not slip on the pulleys 66, 68. Reference numeral 84 denotes an oil pump which serves as a hydraulic power source used in a hydraulic control system for controlling the CVT 16. The oil pump 84 is connected to the pump impeller 28 of the torque converter 12, whereby the pump 84 is rotated with the crankshaft 26 of the engine 10.

The reduction gear device 18 includes a first gear 86 which is provided on the output shaft 45 of the CVT 16 to serve as an output gear of the device 18, a rotary shaft 88 which is rotatable about its axis parallel to the axis of the first gear 86, a second gear 90 which is fixed on the shaft 88 and meshes with the first gear 86, and a third gear 92 which is fixed on the shaft 88 and meshes with a large-diameter gear 94 of the differential gear device 20. The third gear 92 has a smaller diameter than the second gear 90.

The differential gear device 20 includes a pair of small differential gears 96 which are rotated with the large-diameter gear 94, about the axis perpendicular to the axis of rotation of the drive axles 22, and a pair of large differential gears 98 which mesh with the small differential gears 96 and are connected to the drive axles 22. In this arrangement, power transmitted from the reduction gear device 18 is divided by the differential gear device 20 into two portions, which are transmitted to the right and left drive wheels 24 through the respective drive axles 22.

An electronic control device 110 for controlling the vehicle power transmitting system includes a so-called microcomputer which incorporates a central processing unit (CPU) 112, a random-access memory (RAM) 114, a read-only memory (ROM) 116 and an interface (not shown). The control device 110 receives various signals from various sensors, such as: a VEHICLE speed sensor 118 disposed to detect the rotating speed of the drive wheels 24, and generating a vehicle speed signal representative of the detected speed, i.e., a running speed SPD of the vehicle; an INPUT SHAFT speed sensor 120 disposed to detect the rotating speed of the input shaft 44 of the CVT 16, and generating an input shaft speed signal representative of the detected speed Nin of the input shaft 44; an OUTPUT SHAFT speed sensor 122 disposed to detect the speed of the output shaft 45 of the CVT 16, and generating an output shaft speed signal representative of the detected speed Nout of the output shaft 45; a THROTTLE POSITION sensor 124 disposed to detect an angle $\theta$th of opening of a throttle valve 428 (FIG. 7) disposed in an intake pipe of the engine 10, and generating a throttle signal representative of the opening angle $\theta$th of the throttle valve; and a SHIFT LEVER sensor 128 disposed to detect the currently selected operating position, LOW"L", SECOND "S", DRIVE "D", NEUTRAL "N", REVERSE "R" or PARKING "P", of the shift lever 126, and generating a signal representative of the currently selected position Ps of the shift lever 126. The CPU 112 of the electronic control device 110 processes these input signals according to control programs stored in the ROM 114, while utilizing a temporary data storage function of the RAM 116, and applies appropriate drive or control signals to a first and a second solenoid-operated valve 102, 104, and a linear solenoid valve 106, which are incorporated in a hydraulic control device 100 for controlling the power transmitting system of FIG. 1.

Figure 2:
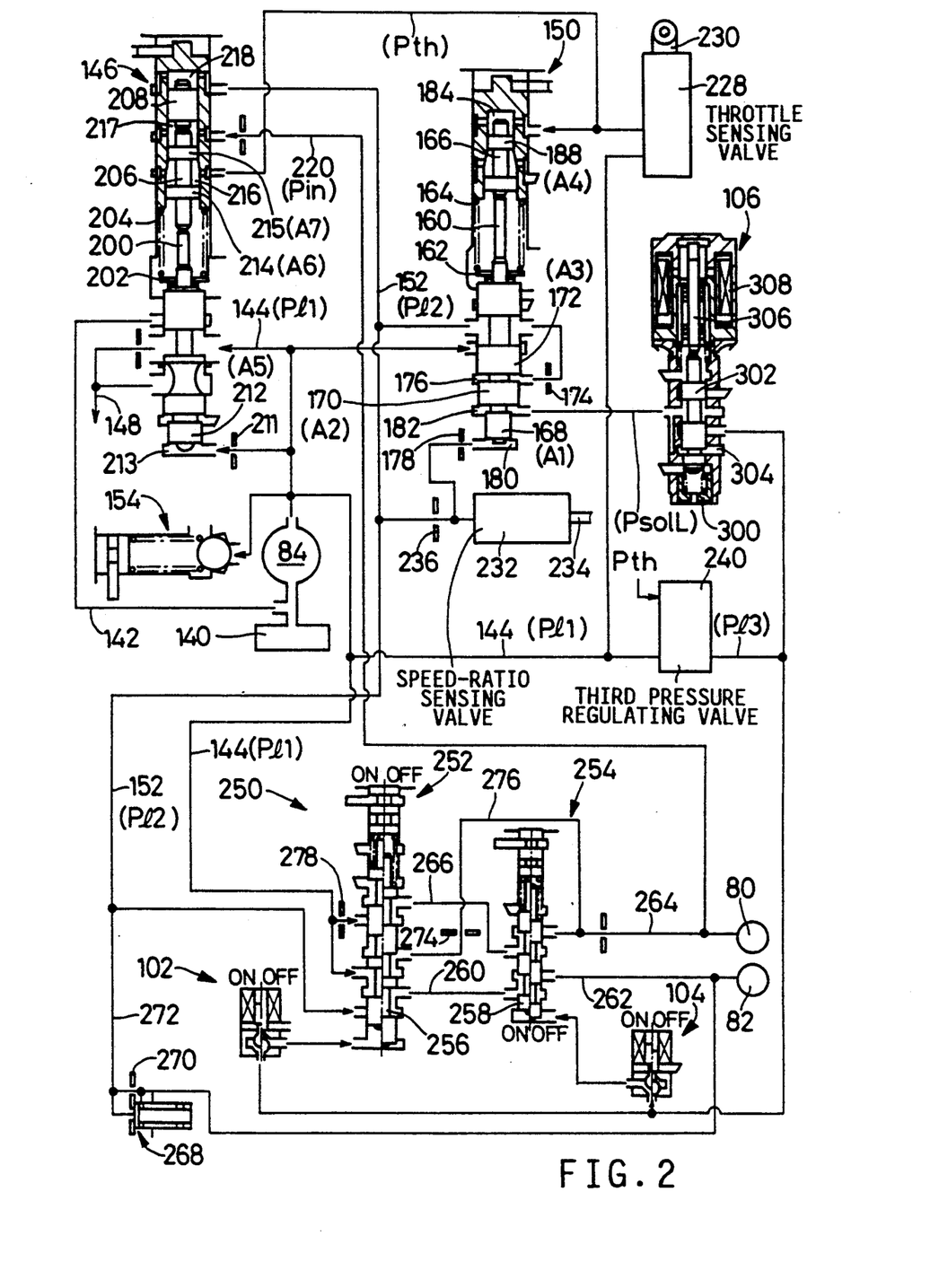
FIG. 2 is a hydraulic circuit diagram showing a part of the hydraulic control device of the power transmitting system of FIG. 1.

Referring next to FIG. 2 showing a principal part of the hydraulic control circuit 110, the oil pump 84 as the hydraulic power source pumps up a working fluid through a strainer 140 from a reservoir to which the fluid is returned. The pump 84 also communicates with a return line 142, so that the fluid returned through the return line 142 is sucked into the pump 84. The pressurized fluid produced by the pump 84 is delivered as a first line pressure Pl1 into a first pressure line 144. In the present embodiment, the first line pressure Pl1 is regulated by an overflow or relief type first pressure regulating valve 146, which discharges the fluid in the first pressure line 144 into the return line 142 and a lock-up pressure line 148. The first line pressure Pl1 is lowered by a second pressure regulating valve 150, to produce a second line pressure Pl2 in a second pressure line 152. The second pressure regulating valve 150 is of a pressure reducing type, contrary to the overflow type of the first pressure regulating valve 146. The first pressure line 144 is provided with a relief valve 154 for preventing the first line pressure Pl1 from excessively rising beyond a predetermined level.

The second pressure regulating valve 150 includes a valve spool 160 for effecting connection and disconnection of the first pressure line 144 to and from the second pressure line 152, a spring sheet 162, a return spring 164, and a plunger 166. The valve spool 160 is provided at one axial end portion thereof remote from the plunger 166, with a first, a second and a third land 168, 170 and 172, which have different diameters. The first land 168 at the extreme end of the spool 160 has the smallest diameter, while the axially intermediate third land 172 has the largest diameter. Between the second and third lands 170, 172, there is formed a chamber 176 to which is applied as a feedback pressure the second line pressure Pl2 through a flow restrictor 174, so that the valve spool 160 is biased toward its closed position by the second line pressure Pl2. Another chamber 180 is formed adjacent the first land 168 at the above-indicated one end of the valve spool 160. To this chamber 180, there is applied a SPEED-RATIO pressure Pr (which will be described) through a flow restrictor 178. This pressure Pr also biases the valve spool 160 toward the closed position. The return spring 164 disposed around the valve spool 160 biases the spool 160 toward its open position, through the spring sheet 162. Between the first and second lands 168, 170 of the valve spool 160, there is formed a chamber 182 which is adapted to receive a pilot pressure PsolL generated by the linear solenoid valve 106. The pilot pressure PsolL biases the spool 160 toward the closed position. The plunger 166 has a small-diameter land 88 at one axial end portion thereof, which partially defines another chamber 184. The chamber 184 is adapted to receive a THROTTLE pressure Pth (which will be described) which biases the spool 160 toward its open position.

The valve spool 160 is positioned under equilibrium of forces according to the following equation (1)

$$Pl2 = [A4 \cdot Pth + W - A1 \cdot Pr - (A2 - A1)PsolL]/(A3 - A2) \quad (1)$$

where,

A1: pressure-receiving area (cross sectional area) of the first land 168;

A2: cross sectional area of the second land 170;

A3: cross sectional area of the third land 172;

A4: pressure-receiving area of the small-diameter land 188 of the plunger 166;

W: biasing force of the return spring 164.

Figure 3:
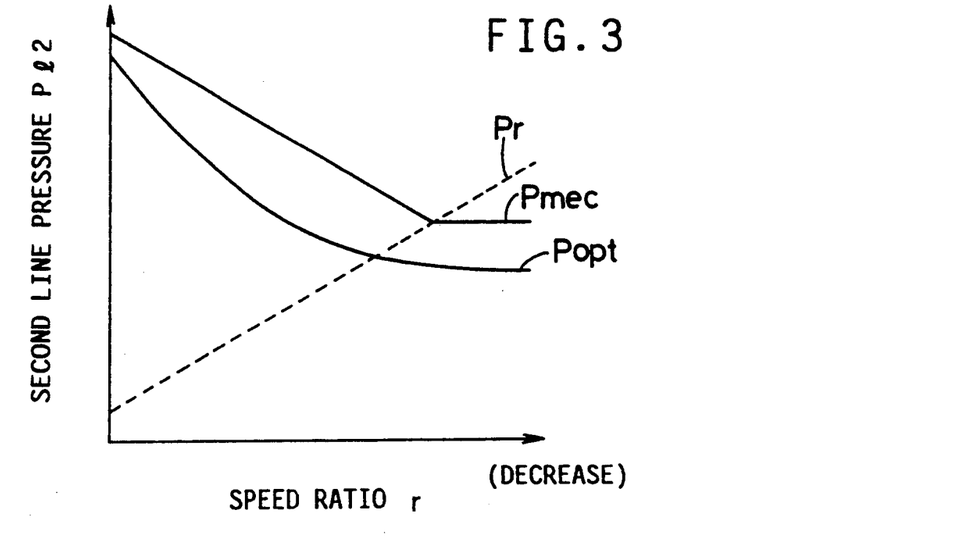
FIG. 3 is a graph showing an output characteristic of a second pressure regulating valve incorporated in the control device of FIG. 2.

Namely, the valve spool 160 is axially moved according to the equation (1), so as to repeatedly alternately establish a first position for permitting a flow of the fluid from the first pressure line 144 into the second pressure line 152, and a second position for draining the second pressure line 152 through a drain port. As a result, the second line pressure Pl2 is produced. Since the second pressure line 152 is a closed hydraulic circuit, the second line pressure Pl2 can be adjusted as indicated in FIG. 3 by the second pressure regulating valve 150, by lowering the relatively high first line pressure Pl1. In the graph of FIG. 3 which shows the basic output characteristic of the second pressure regulating valve 150 where the THROTTLE pressure Pth is held constant, a solid bent line is indicative of the basic output pressure Pmec which is produced as the second line pressure Pl2 when the pilot pressure PsolL is zero, while a solid curved line is an ideal curve indicative of an optimum value Popt of the second pressure line Pl2 for maintaining the tension of the transmission belt 70 at a required minimum level. The pilot pressure PsolL is applied to the valve 150 to suitably lower the basic output pressure Pmec so that the second line pressure Pl2 is regulated to the optimum value Popt.

The first pressure regulating valve 146 includes a valve spool 200, a spring sheet 202, a return spring 204, a first plunger 206 having a first and a second land 214, 215, and a second plunger 208 whose diameter is the same as the second land 215 of the first plunger 206. The valve spool 200 is operated to effect selective connection and disconnection of the first pressure line 144, to and from the return line 142 or the lock-up pressure line 148. Adjacent the first land 212 of the spool 200, there is formed a chamber 213 which receives as a feedback pressure the first line pressure Pl1 through a flow restrictor 211. The valve spool 200 is biased toward its open position by this first line pressure Pl1. The first and second lands 214, 215 of the first plunger 206 cooperate with each other to define a chamber 216 adapted to receive the THROTTLE pressure Pth. Between the second land 215 of the first plunger 206 and the second plunger 208, there is formed a chamber 217 adapted to receive a pressure Pin in the first hydraulic cylinder 80, through a branch line 220 connected to the cylinder 80. Further, a chamber 218 is formed adjacent the end face of the second plunger 208. The chamber 218 receives the second line pressure Pl2. The biasing force of the above-indicated return spring 204 acts on the valve spool 200 through the spring sheet 202 so as to bias the spool 200 toward its closed position. The valve spool 200 is positioned under equilibrium of forces according to the following equation (2):

$$Pl1 = [(Pin \text{ or } Pl2) \cdot A7 + Pth(A6 - A7) + W]/A5 \qquad (2)$$

where,

A5: pressure-receiving area of the first land 212 of the valve spool 200;

A6 cross sectional area of the first land 214 of the first plunger 206;

A7: cross sectional area of the second land 215 of the first plunger 206 (second plunger 208);

W: biasing force of the return spring 204.

In the first pressure regulating valve 146, the first and second plungers 206, 208 are separated from each other and a thrust due to the pressure Pin in the first cylinder 80 acts on the valve spool 200 in the direction toward the closed position, when the pressure Pin is higher than the second line pressure Pl2 (which is normally equal to the pressure Pout in the second cylinder 82). When the pressure Pin is lower than the second line pressure Pl2, the first and second plungers 206, 208 are held in abutting contact with each other, whereby a thrust due to the second line pressure Pl2 acting on the end face of the second plunger 208 acts on the valve spool 200 in the direction toward its closed position. That is, the second plunger 208 receiving the pressure Pin and the second line pressure Pl2 applies to the spool 200 a force based on the higher one of the pressures Pin and Pl2, so that the spool 200 is biased toward its closed position. Thus, an optimum level of the first line pressure Pl1 is produced during a positive-torque and a negative-torque running of the vehicle.

Figure 4:
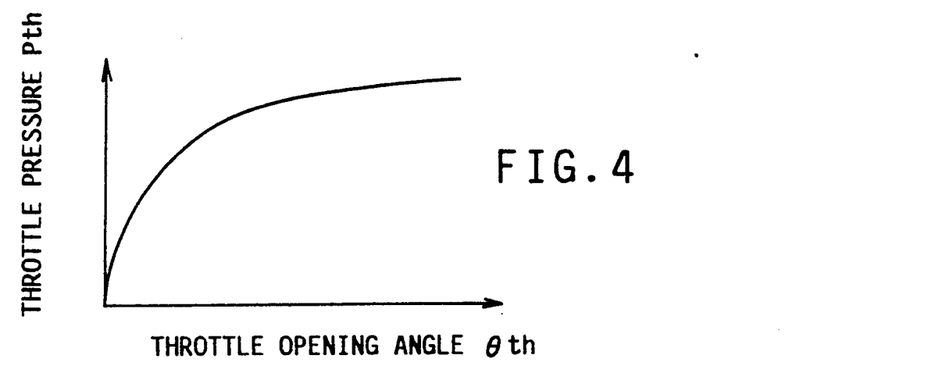
FIG. 4 is a graph showing an output characteristic of a throttle sensing valve incorporated in the control device of FIG. 2.
Figure 5:
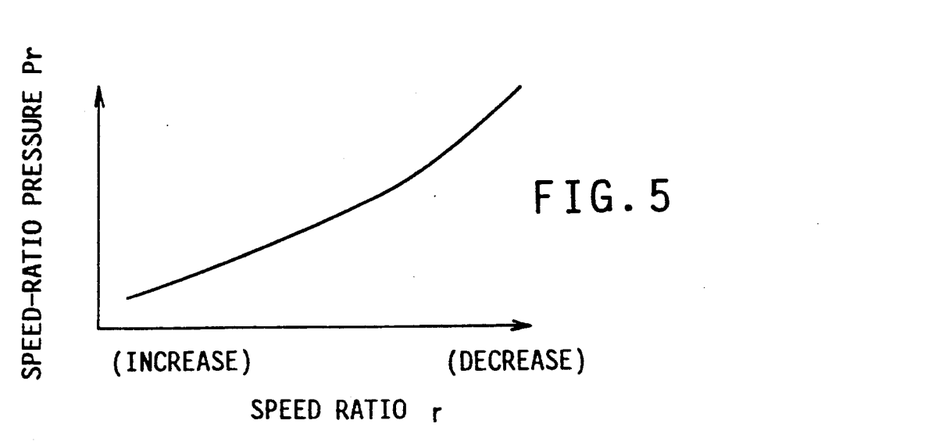
FIG. 5 is a graph showing an output characteristic of a speed-ratio sensing valve incorporated in the control device of FIG. 2.

The THROTTLE pressure Pth representing the actual opening angle $\theta$th of the throttle valve 428 of the engine 10 is generated by a throttle sensing valve 228. Further, the SPEED-RATIO pressure Pr representing an actual speed ratio "r" of the CVT 16 is generated by a speed-ratio sensing valve 232. These throttle sensing valve 228 and speed-ratio sensing valve 232 are constructed as well known in the art, as disclosed in JP-A-64-49749, for example. More specifically, the throttle sensing valve 228 includes a plunger 230 which engages a cam surface of a cam that is rotated as the throttle valve of the engine 10 is operated and which is axially moved by a distance corresponding to an angle of rotation of the cam. This valve 228 produces the THROTTLE pressure Pth as indicated in the graph of FIG. 4, based on a thrust corresponding to an amount of axial movement of the plunger 230. The speed-ratio sensing valve 232 includes a sensing rod 234 which slidably contacts the axially movable rotor 76 on the input shaft 44 of the CVT 16 and which is axially displaced by a distance equal to an amount of axial movement of the movable rotor 76. This valve 232 produces the SPEED-RATIO pressure Pr as indicated in the graph of FIG. 5, by adjusting the amount of discharge flow of the fluid in a line downstream of a flow restrictor 236, depending upon an amount of axial displacement of the sensing rod 234.

It will be understood from the above description that the SPEED-RATIO pressure pr will not exceed the second line pressure Pl2 since the pressure Pr is produced by adjusting the amount of discharge flow of the fluid which is fed from the second pressure line 152 through the flow restrictor 236. Further, the second pressure regulating valve 150 is operated according to the equation (1) indicated above, such that the second line pressure Pl2 is lowered with an increase in the SPEED-RATIO pressure Pr. Accordingly, when the pressure Pr increases up to the level of the second line pressure Pl2, both of the pressures Pr and Pl2 are held constant at a maximum level, as indicated in the graph of FIG. 3. It will be understood from FIG. 3 that the basic output pressure Pmec linearly decreases with an increase in the SPEED-RATIO pressure Pr when the speed ratio "r" of the CVT 16 decreases from the maximum value. After the speed ratio "r" reaches a given value where the basic output pressure Pmec is equal to the SPEED-RATIO pressure Pr, the pressure Pmec is held constant.

A third pressure regulating valve 240 is adapted to produce a third line pressure Pl3 which is suitably used for operating the REVERSE brake 64 and FORWARD clutch 62 of the reversing device 14, and which serves as pilot pressures for the first and second solenoid-operated valves 102, 104 and linear solenoid valve 106. The third pressure regulating valve 240 may be constructed as disclosed in JP-A-64-49749, for example. The third line pressure Pl3 is regulated by this valve 240 to an optimum level, which is determined to assure optimum torque transmitting capacity of the FORWARD clutch 62 and the REVERSE brake 64 during engagement of the clutch 62 or brake 64 to run the vehicle in the forward or reverse direction, without slipping of the clutch 62 or brake 64.

The first and second line pressures Pl1 and Pl2 adjusted by the first and second pressure regulating valves 146, 150, respectively, are applied to the one and the other of the first and second hydraulic cylinders 80, 82 of the CVT 16 through a shift control valve unit 250, for controlling the speed ratio "r" of the CVT 16. The shift control valve unit 250 has a directional control valve 252 and a flow control valve 254. The third line pressure Pl3 indicated above is used as the pilot pressures for actuating these control valves 252 and 254.

The directional control valve 252 has a valve spool 256 whose position is controlled by the first solenoid-operated valve 102, while the flow control valve 254 has a valve spool 258 whose position is controlled by the second solenoid-operated valve 104. When the first and second solenoid-operated valves 101, 102 are both on, the valve spools 256, 258 of the valves 252, 254 are both placed in the upper positions as seen in FIG. 2, whereby the fluid in the first pressure line 144 is fed into the second hydraulic cylinder 82 through the directional control valve 252, a first connecting line 260, the flow control valve 254, a second cylinder line 262, while the fluid in the first hydraulic cylinder 80 is discharged into a drain through a first cylinder line 264, the flow control valve 254, a second connecting line 266 and the directional control valve 252. Consequently, the CVT 16 is rapidly shifted down with the speed ratio "r" being increased to lower the vehicle speed.

In the state described just above, if the second solenoid-operated valve 104 is turned off while the first solenoid-operated valve 102 is held on, the valve spool 258 of the flow control valve 254 is moved to its lower position, whereby the fluid in the second pressure line 152 is fed into the second hydraulic cylinder 82 through a by-pass line 272 in which a check valve 268 and a flow restrictor 270 are disposed in parallel with each other. At the same time, the fluid in the first hydraulic cylinder 80 is discharged through a small clearance formed between a piston and a mating sliding surface of the cylinder 80. Consequently, the CVT 16 is slowly shifted down with the speed ratio "r" being slowly increased.

While the first solenoid-operated valve 102 is off while the second solenoid-operated valve 104 is on, the fluid in the first pressure line 144 is fed into the first hydraulic cylinder 80 through a relatively large flow restrictor 278, directional control valve 252, second connecting line 266, flow control valve 254 and first hydraulic line 264, while the fluid in the second hydraulic cylinder 82 is discharged to the second pressure line 152 through the second cylinder line 262, flow control valve 254, first connecting line 260 and directional control valve 252. Consequently, the CVT 16 is rapidly shifted up with the speed ratio "r" being reduced so as to increase the vehicle speed.

In the state described just above, if the second solenoid-operated valve 104 is turned off while the first solenoid-operated valve 102 is held off, the fluid in the first pressure line 144 is fed to the first hydraulic cylinder 80 through the directional control valve 252 and a third connecting line 276 equipped with a flow restrictor 274, while the fluid in the second hydraulic cylinder 82 is discharged to the second pressure line 152 through the by-pass line 272. Consequently, the CVT 16 is slowly shifted up with the speed ratio "r" being slowly reduced. Thus, the shift control valve unit 250 has four shifting modes, one of which is selectively established to perform a desired shifting operation of the CVT 16.

In FIG. 2, the upper and lower positions of the directional and flow control valves 52, 254 are labeled with "ON" and "OFF", respectively, which correspond to the on-off states (also labeled with "ON" and "OFF") of the corresponding first and second solenoid-operated valves 102, 104. The first and second solenoid-operated valves 102, 104 are a three way switch valve having a ball-like spool, an inlet port, an outlet port and a drain port. When the solenoid-operated valve 102, 104 is placed in an energized position (ON), the inlet and outlet ports communicate with each other with the drain port closed by the ball-like spool, whereby the third line pressure Pl3 is applied from the valve 102, 104 to the corresponding control valve 252, 254. When the valve 102, 104 is placed in a non-energized position (OFF), the inlet port is closed by the ball-like spool while the outlet port communicates with the drain port.

Figure 6:
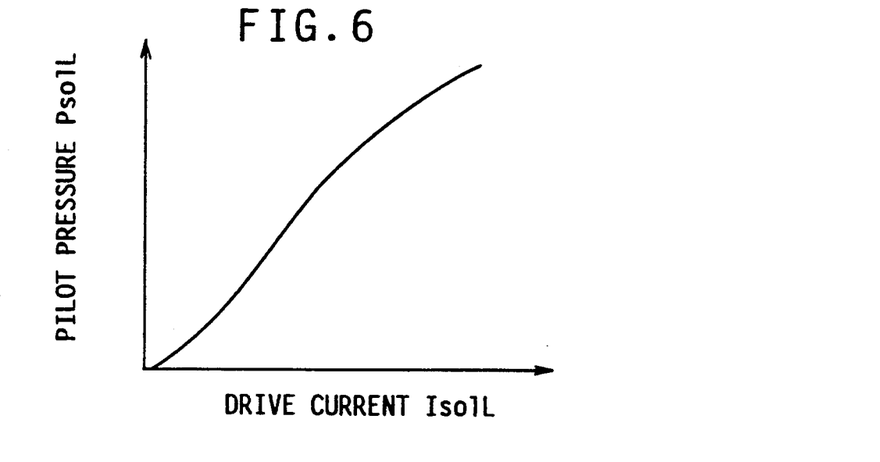
FIG. 6 is a graph showing an output characteristic of a linear solenoid valve incorporated in the control device of FIG. 2.

The linear solenoid valve 106 produces the pilot pressure PsolL by reducing the third line pressure Pl3. The valve 106 includes: a valve spool 302; a spring 300 for biasing the spool 302 toward its closed position; a chamber 304 which receives the pilot pressure PsolL as a feedback pressure acting on the spool 302; a linear solenoid coil 308 which is energized by a drive signal received from the electronic control device 110; and a core 306 which produces a continuously varying thrust to bias the spool 302 toward its open position, upon energization of the coil 308. The pilot pressure PsolL generated by this valve 106 is continuously increased with an increase in the magnitude of the drive signal (i.e., a drive current IsolL) applied to the solenoid coil 308, as indicated in the graph of FIG. 6. Namely, the pilot pressure PsolL is regulated according to the following equation (3):

$$PsolL = (F_{L1} - W_{L1})/A_{L1} \tag{3}$$

where, $W_{L1}$: biasing force of the spring 300;
$A_{L1}$: pressure-receiving area of the valve spool 302;
$F_{L1}$ thrust force by the core 306.

Figure 7:
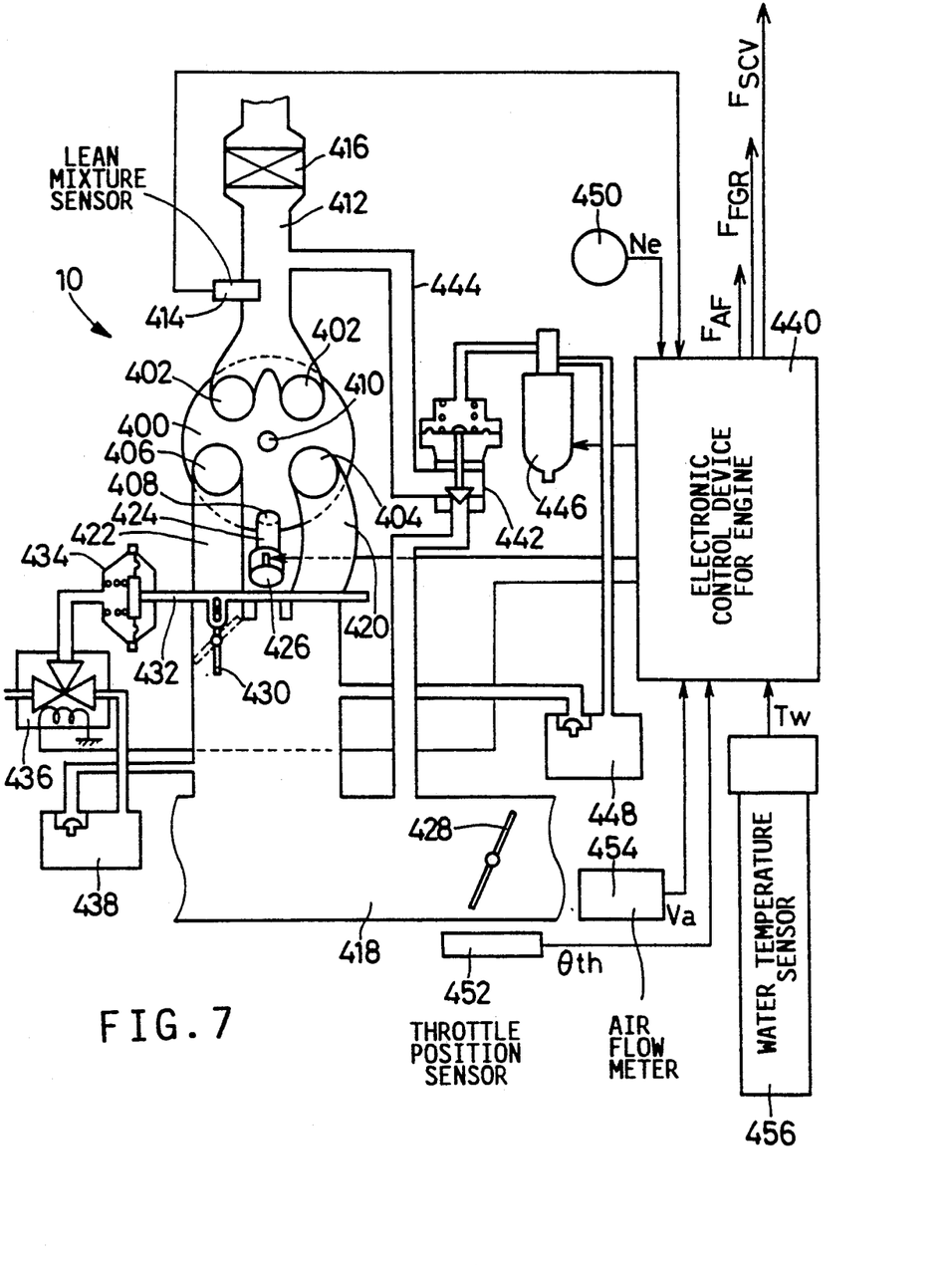
FIG. 7 is a schematic view of a combustion control apparatus including an electronic control device for controlling a burning condition of an engine shown in FIG. 1.

Referring next to FIG. 7, there is schematically shown a principal part of the engine 10 in the form of a lean burn type internal combustion engine having a plurality of cylinders (only one of which is shown in the figure). For each combustion chamber 400 of each cylinder, a cylinder head has a pair of exhaust valves 402, a first, a second and a third intake valve 404, 406 and 408, and a spark plug 410. Two exhaust ports which are opened and closed by the exhaust valves 402 are connected to a common exhaust pipe 412, which is provided with a lean mixture sensor 414 and a three-way catalytic converter 416. The lean mixture sensor 414 is capable of dealing with not only exhaust gases emitted by combustion of an air-fuel mixture whose air-fuel ratio is equal to or near the stoichiometric value (A/F=14.5), like the conventional oxygen sensor, but also lean-burned exhaust gases emitted by combustion of a fuel-lean air-fuel mixture whose air-fuel ratio is higher than the stoichiometric value. While the term "air-fuel ratio" used herein is interpreted to mean the weight ratio of the air to the fuel included in the mixture (weight of the air/weight of the fuel=A/F), the term may instead refer to the weight ratio of the whole gas in the combustion chamber 400 to the fuel in the chamber 400 (total weight of the air and circulating gas/weight of the fuel=G/F).

The engine 10 includes an intake pipe 418 having a helical intake port 420 and a straight intake port 422 which are disposed substantially parallel to each other. These two intake ports 420, 422 are opened and closed by the first and second intake valves 404, 406, respectively. The intake pipe 418 further has a fuel injection port 424 having a smaller cross sectional area than those of the intake ports 420, 422. This fuel injection port 424 is opened and closed by the third intake valve 408, and is provided with a fuel injection valve 426 through which a suitable amount of a fuel is injected. This port 424 is positioned such that the fuel injected through the valve 426 is directed to the spark plug 410 located at the center of the combustion chamber 400. The intake pipe 418 is further provided with the throttle valve 428 as well known in the art, for regulating the amount of the intake air.

The straight intake port 422 is provided with a swirl control valve (SCV) 430, which is actuated by a vacuum actuator 434 through a link 432. This vacuum actuator 434 is connected to a first vacuum tank 438, through a three-way solenoid-operated valve 436 which is controlled by an electronic control device 440 for controlling the engine 10. The first vacuum tank 438 is equipped with a check valve which permits a vacuum pressure from the intake pipe 418 to be accumulated in the tank 438. In this arrangement, the swirl control valve 430 is opened and closed under control of the electronic control device 440 for the engine 10. While the swirl control valve 430 is open, the intake air from the intake pipe 418 is introduced into the combustion chamber 400 through the helical intake port 420 and straight intake port 422. While the swirl control valve 430 is closed, on the other hand, the intake air is introduced into the combustion chamber 400 only through the helical intake port 420, so as to produce a considerably strong swirl or turbulent flow of the air in the chamber 400.

The first, second and third intake valves 404, 406 and 408 are actuated by a camshaft which is rotated with the crankshaft of the engine 10, so that these intake valves 404, 406, 408 are opened and closed at a predetermined relative timing. For example, the timing of opening and closing of the first and third intake valves 404, 408 is determined so that the third intake valve 408 is opened at a point of time near the end of the duration in which the first intake valve 404 is held open. Consequently, a layer of the fuel is formed in the upper region of the combustion chamber 400, assuring stable ignition even if the air-fuel mixture is relatively lean. This effect is combined with the above-described swirl of the air in the combustion chamber 400 while the swirl control valve 430 is closed, to permit considerably efficient combustion of a fuel-lean air-fuel mixture. When the swirl control valve 430 is opened, a relatively large amount of the intake air can be introduced from the intake pipe 418 into the chamber 400, assuring a sufficiently large output of the engine 10.

Between the intake pipe 418 and the exhaust pipe 412, there is provided an exhaust gas recirculating (EGR) passage 444 equipped with an EGR valve 442. This EGR valve 442 is of a vacuum modulation type as well known in the art, and is thus controlled by a vacuum signal generated by a vacuum signal generating valve 446. This valve 446 communicates with a second vacuum tank 448, which is equipped with a check valve for permitting a vacuum pressure from the intake pipe 418 to be accumulated in the tank 448. The vacuum signal generating valve 446 utilizes the vacuum pressure in the second vacuum tank 448 to produce the vacuum signal for operating the EGR valve 442, in accordance with a control signal received from the electronic control device 440.

The electronic control device 440 for controlling the engine 10 receives various signals from various sensors, such as: the lean mixture sensor 414 generating a signal representative of the oxygen concentration of exhaust gases within the exhaust pipe 412; an engine speed sensor 450 generating a signal representative of the engine speed Ne; the THROTTLE POSITION sensor 452 generating a signal indicative of the opening angle θth of the throttle valve 428; an air flow meter 454 generating a signal indicative of an intake air volume Va; and a water temperature sensor 456 generating a signal indicative of a temperature Tw of the engine coolant. Like the above-described electronic control device 110 for the power transmitting system, the electronic control device 440 for the engine 10 includes a microcomputer which incorporates a central processing unit (CPU), a random-access memory (RAM), a read-only memory (ROM) and an interface. The CPU of the electronic control device 440 processes the above-indicated input signals according to control programs stored in the ROM, while utilizing a temporary data storage function of the RAM, and applies appropriate drive or control signals to the fuel injection valve 426, three-way solenoid-operated valve 436, and vacuum signal generating valve 446, so as to reduce the amounts of HC, CO and NOx included in the exhaust gases while assuring significantly reduced fuel consumption.

Figure 8:
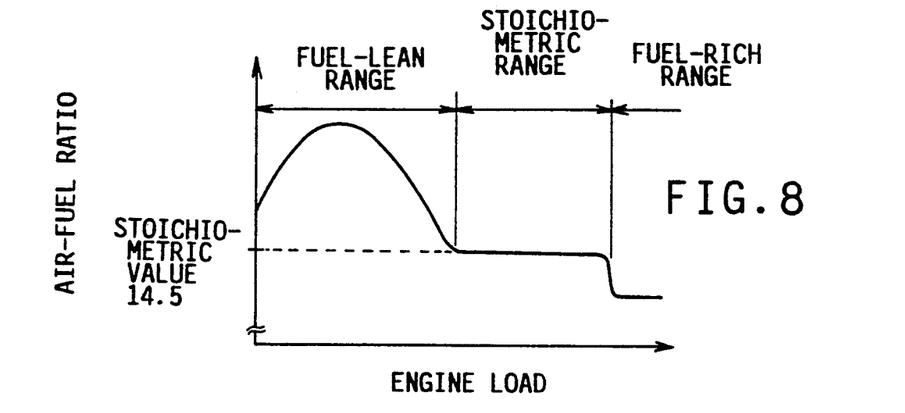
FIG. 8 is a graph indicating a relationship stored in the electronic control device of FIG. 7, between the engine load, and the air-fuel ratio of an air-fuel mixture to be supplied to the engine.
Figure 9:
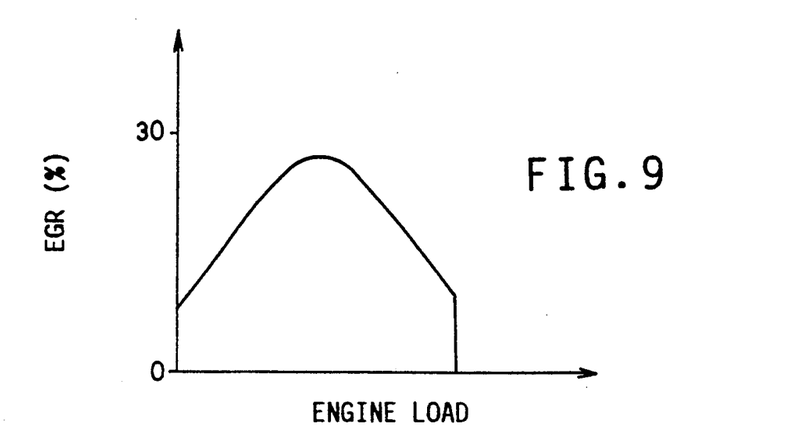
FIG. 9 is a graph indicating a relationship stored in the electronic control device of FIG. 7, between the engine load, and the EGR (Exhaust Gas Recirculation) rate.

The electronic control device 440 controls the valves 426, 436 to control the air-fuel ratio of the air-fuel mixture to be supplied to the engine 10, depending upon the engine load, such that the controlled air-fuel ratio varies through a fuel-lean range in which the air-fuel ratio is higher than the stoichiometric value (A/F=14.5), to a stoichiometric range in which the air-fuel ratio is equal to or near the stoichiometric value, and to a fuel-rich range in which the air-fuel ratio is lower than the stoichiometric value, as shown in the graph of FIG. 8. At the same time, the control device 440 controls the valve 446 to control an EGR (Exhaust Gas Recirculation) rate depending upon the engine load, as shown in the graph of FIG. 9. FIGS. 8 and 9 show output characteristics of the control device 440 when the engine speed Ne is held at a relatively low constant value. As well known in the art, the above-indicated engine load is determined based on a combination of a parameter such as an air intake rate Q/Ne, a vacuum pressure Pv in the intake pipe 418, or the throttle opening angle θth, and a parameter such as the engine speed Ne or vehicle speed SPD. It will be understood from the graphs of FIGS. 8 and 9 that the electronic control device 440 controls the engine 10 to be sequentially supplied with a fuel-lean air-fuel mixture, a stoichiometric mixture whose air-fuel ratio is equal to or near the stoichiometric value, and a fuel-rich air-fuel mixture, as the engine load increases. The control device 440 also controls the vacuum signal generating valve 446 to govern the EGR valve 442 so that the EGR rate becomes maximum in the fuel-lean range when the engine load is relatively large.

The electronic control device 440 for the engine 10 sets a flag $F_{AF}$ relating to the actual or current air-fuel ratio of the air-fuel mixture supplied to the engine 10, a flag $F_{EGR}$ relating to the actual EGR rate, and a flag $F_{SCV}$ indicative of whether the swirl control valve 430 is open or closed. The control device 440 is adapted to transmit signals indicative of contents of these flags $F_{AF}$, $F_{EGR}$ and $F_{SCV}$ to the electronic control device 110 for the power transmitting system indicated above.

More specifically described, the flag $F_{AF}$ is set to "1" when the actual air-fuel ratio is higher than the stoichiometric value, i.e., when the engine 10 is supplied with a fuel-lean air-fuel mixture. The flag $F_{AF}$ is reset to "0" when the actual air-fuel ratio is lower than the stoichiometric value, i.e., when the engine 10 is supplied with a fuel-rich air-fuel mixture. The flag $F_{EGR}$ is set to "1" when the actual EGR rate is equal to or higher than a predetermined reference value, and is reset to "0" when the EGR rate is lower than the reference value. This reference value, which is used to determine whether the engine 10 is effecting exhaust gas recirculation (EGR) or not, is set to be close to but higher than 0%, for example. The flag $F_{SCV}$ is set to "1" when the opening angle of the swirl control valve 430 is equal to or larger than a predetermined reference value, and is reset to "0" when the opening angle of the valve 430 is smaller than the reference value. This reference value, which is used to determine whether the swirl control valve 430 is placed in its open position or closed position, is set to be close to but higher than 0%, for example.

Figure 10:
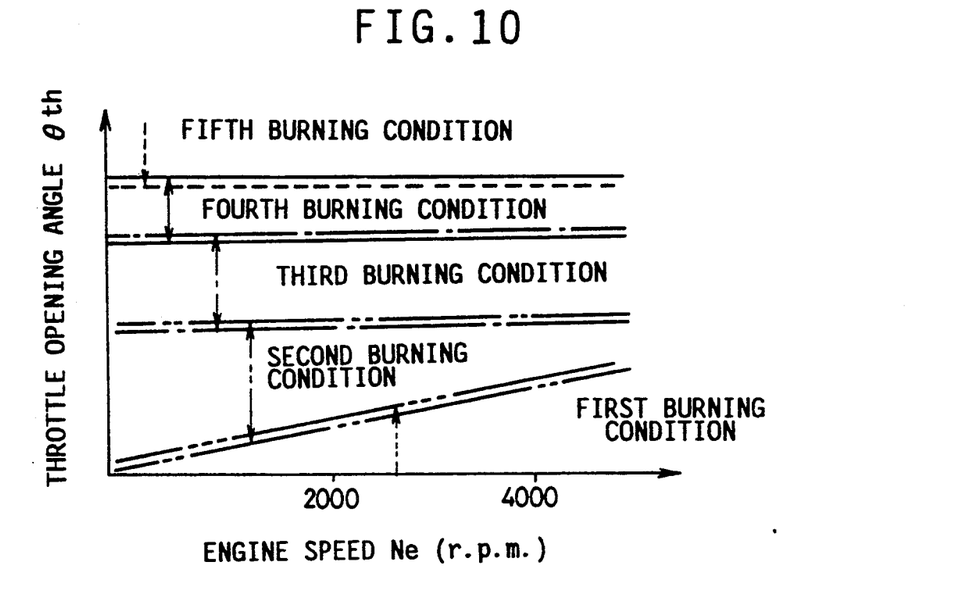
FIG. 10 is a graph indicating five regions which correspond to five burning conditions of the engine, one of which is established by the combustion control apparatus of FIG. 7.

The electronic control device 440 is adapted to determine an appropriate one of a predetermined number of burning conditions of the engine 10 as indicated in FIG. 10, based on the engine speed Ne and the throttle opening angle $\theta$th, so as to select or establish an appropriate operating mode of the engine 10. FIG. 10 shows five regions which respectively correspond to five burning conditions (which will be described). To establish the operating mode corresponding to the determined burning condition of the engine 10, the control device 440 controls the fuel injection valve 426, swirl control valve 430, EGR valve 442 and other components, according to the determined engine burning condition. It will be understood from the graph of FIG. 11 that the output torque Te of the engine 10 varies depending upon the burning condition of the engine 10. In FIG. 10, two adjacent regions indicative of two burning conditions of the engine 10 overlap to provide hysteresis areas, in which the two burning conditions coexist to provide two different output torques associated with these burning conditions, even if the engine speed Ne and throttle opening angle $\theta$th are constant. These hysteresis areas are effective to prevent hunting upon change of the burning conditions.

Figure 11:
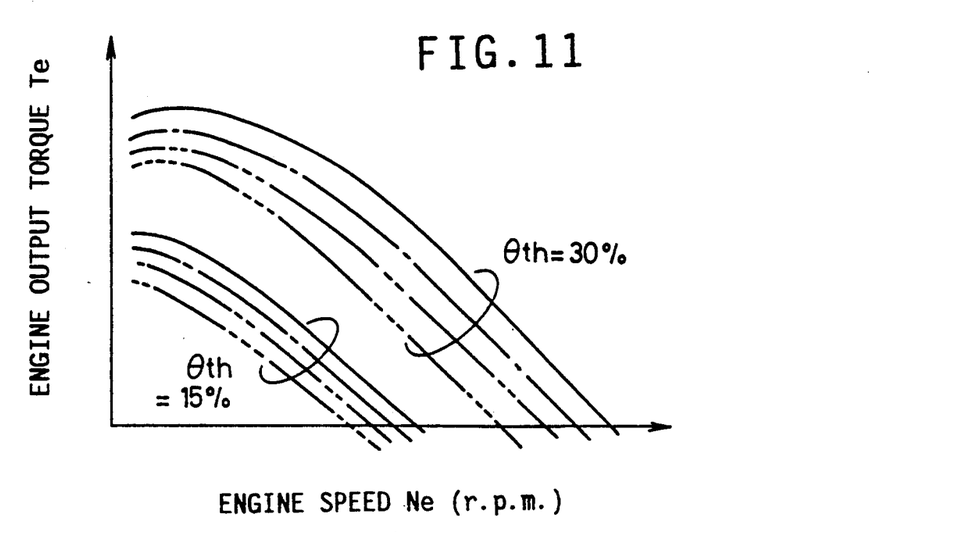
FIG. 11 is a graph indicating a characteristic of the output torque of the engine, with respect to the respective burning conditions indicated in FIG. 10.

In FIGS. 10 and 11, the three-dot chain line indicates a first burning condition wherein the fuel-lean air-fuel mixture is burned with the swirl control valve 430 being closed while effecting EGR, and the two-dot chain lines indicate a second burning condition wherein the stoichiometric air-fuel mixture is burned with the valve 430 being closed while effecting EGR. Further, the one-dot chain lines indicate a third burning condition wherein the stoichiometric air-fuel mixture is burned with the swirl control valve 430 being closed, and the solid lines indicate a fourth burning condition wherein the stoichiometric air-fuel mixture is burned with the valve 430 being open. While the dashed line in FIG. 10 indicates a fifth burning condition wherein the fuel-rich air-fuel mixture is burned with the swirl control valve 430 being open, this burning condition is not shown in FIG. 11 nor will be referred to in the following description. The fifth burning condition is selected when the throttle opening angle $\theta$th is extremely large. Further, the above-indicated second burning condition may be considered as a fuel-lean burning condition (combustion of a fuel-lean air-fuel mixture) in a broad sense, since the air-fuel ratio G/F of the air-fuel mixture to be burned in the second burning condition is higher than the stoichiometric value.

The electronic control device 110 for the power transmitting system operates to control the speed ratio "r" of the CVT 16 to the optimum value depending upon the running condition of the vehicle, and effect other control operations, such as the operation to regulate the second line pressure Pl2 serving as a belt tensioning pressure for maintaining the tension of the transmission belt 70 at the optimum level, depending upon the input torque and speed ratio "r" of the CVT 16. In controlling the speed ratio "r" of the CVT 16, the control device 110 calculates a desired or target speed Nin* of the input shaft 44 from the currently detected throttle opening angle $\theta$th and running speed SPD of the vehicle, according to a predetermined relationship among the parameters Nin*, $\theta$th and SPD, which is stored in the ROM 114. This relationship is determined for minimum fuel consumption by the engine 10 and maximum drivability of the vehicle. The control device 110 selects one of the shifting modes of the CVT 16 indicated above to operate the CVT 16 so that the actual speed Nin of the input shaft 44 coincides with the determined desired value Nin*. Depending upon the selected shifting mode of the CVT 16, the first and second solenoid-operated valves 102 and 104 are controlled so as to enable the shift control valve unit 250 to adjust the speed ratio "r" of the CVT 16 to the optimum value. The above-indicated relationship among the parameters Nin*, $\theta$th and SPD is selected from a plurality of stored relationships which correspond to respective driving positions of the shift lever 126, as disclosed in JP-A-60-205067, for example.

Figure 12:
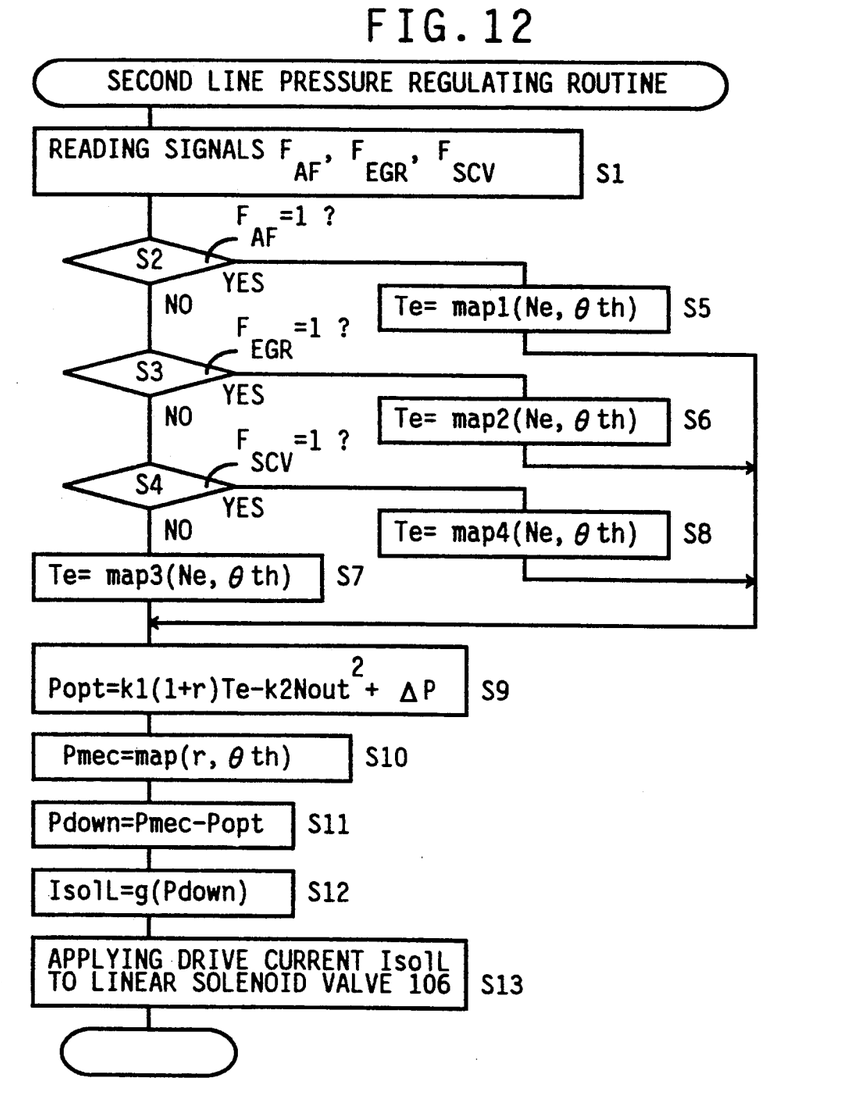
FIG. 12 is a flow chart illustrating a second line pressure regulating routine implemented by the electronic control apparatus used for the power transmitting system of FIG. 1.

The electronic control device 110 for the power transmitting system controls the tension of the belt 70 by execution of a second line pressure regulating routine illustrated in the flow chart of FIG. 12. Initially, step S1 is implemented to read the contents of the flags $F_{AF}$, $F_{EGR}$, and $F_{SCV}$, from the signals received from the electronic control device 440 for the engine 10. Step S1 is followed by step S2 to determine whether the content of the flag $F_{AF}$ is "1" or not. If an affirmative decision (YES) is obtained in step S2, step S5 is then implemented. If a negative decision (NO) is obtained in step S2, the control flow goes to step S3 to determined whether the content of the flag $F_{EGR}$ is "1" or not. If an affirmative decision (YES) is obtained in step S3, step S6 is then implemented. If a negative decision (NO) is obtained in step S3, the control flow goes to step S4 to determined whether the content of the flag $F_{SCV}$ is "1" or not. If a negative decision (NO) is obtained in step S4, step S7 is then implemented. If an affirmative decision (YES) is obtained in step S4, step S8 is then implemented. The above steps S2, S3 and S4 are executed to detect the currently established one of the first, second, third and fourth burning conditions of the engine 10, which provide different engine output torques Te even with the same throttle opening angle $\theta$th or the engine speed Ne.

When the first burning condition (lean, EGR-ON, SCV-CLOSED) is detected, the above step S5 is implemented to calculate the output torque Te based on the engine speed Ne and throttle opening angle $\theta$th, according to a predetermined first stored relationship [map1 (Ne, $\theta$th)] as indicated by the three-dot chain lines in FIG. 11. When the second burning condition (stoichiometric, EGR-ON, SCV-CLOSED) is detected, the above step S6 is implemented to calculate the output torque Te based on the engine speed Ne and throttle opening angle $\theta$th, according to a predetermined second stored relationship [map2 (Ne, $\theta$th)] as indicated by the two-dot chain lines in FIG. 11. When the third burning condition (stoichiometric, SCV-CLOSED) is detected, the above step S7 is implemented to calculate the output torque Te based on the engine speed Ne and throttle opening angle $\theta$th, according to a predetermined third stored relationship [map3 (Ne, $\theta$th)] as indicated by the one-dot chain lines in FIG. 11. When the fourth burning condition (stoichiometric, SCV-OPEN) is detected, the above step S8 is implemented to calculate the output torque Te based on the engine speed Ne and throttle opening angle $\theta$th, according to a predetermined fourth stored relationship [map4 (Ne, $\theta$th)] as indicated by the solid lines in FIG. 11.

After execution of one of the above steps S5, S6, S7 and S8 in which the output torque Te of the engine 10 is calculated, the control flow goes to step S9 to calculate the optimum pressure Popt, based on the current speed ratio "r" of the CVT 16, the calculated output torque Te of the engine 10 (=the input torque of the CVT 16) and the speed Nout of the output shaft 45, according to a predetermined stored relationship as represented by the following equation (4). The pressure Popt should be interpreted to mean a theoretically optimum pressure which is applied to the second hydraulic cylinder 82 in order that the CVT 16 can transmit the input torque without slipping of the belt 70 on the pulleys 66, 68. In the following equation (4), the second term of the right side is to compensate for an increase in the centrifugal pressure, and the third term ($\Delta P$) of the right side is an extra pressure to ensure the torque transmission without slipping of the belt 70.

$$Popt = k1(1+r)Te - k2 \cdot Nout^2 + \Delta P \quad (4)$$

where,
k1: constant;
k2: constant;

Step S9 is followed by step S10 to calculate the basic output pressure Pmec of the second pressure regulating valve 150 based on the current speed ratio "r" and throttle opening angle $\theta$th, according to the above-indicated predetermined relationship as indicated in FIG. 3. Then, the control flow goes to step S11 to calculate a difference between the optimum pressure Popt and the basic output pressure Pmec of the second pressure regulating valve 150, that is, a value Pdown by which the basic output pressure Pmec should be reduced to obtain the optimum pressure Popt, according to the following equation (5). This value Pdown is used to regulate the second line pressure Pl2 so that the pressure Pl2 coincides with the optimum pressure Popt.

$$Pdown = Pmec - Popt \quad (5)$$

Step S11 is followed by step S12 to calculate a required drive current IsolL for actuating the linear solenoid valve 106 so as to generate the pilot pressure PsolL corresponding to the above-indicated value Pdown, according to the predetermined relationship as indicated in FIG. 6. Step S12 is followed by step S13 to apply the calculated drive current IsolL to the valve 106. The above steps S1-S13 are repeatedly executed until the second line pressure Pl2 coincides with the optimum pressure Popt.

It will be understood from the above description that the electronic control device 440 for the engine 10 serves to detect or determined the currently established one of a plurality of burning conditions of the engine 10, and that the electronic control device 110 for the power transmitting system serves to regulate the second line pressure Pl2 as the belt tensioning pressure, based on the actual output torque Te which is accurately calculated according to the predetermined relationship corresponding to the determined burning condition of the engine 10. Therefore, the second line pressure Pl2 can be regulated to the optimum pressure Popt with significantly improved accuracy Consequently, the extra pressure $\Delta P$ in the above equation (4) may be set at a relatively small value, while avoiding slipping of the belt 70 on the pulleys 66, 68, whereby a power loss in the CVT 16 can be reduced to a minimum.

In the known arrangement, the second line pressure 2 is regulated based on the output torque of the engine 10, which is estimated based only on the engine speed Ne and throttle opening angle $\theta$th. In this case, the extra pressure $\Delta P$ must be set at a relatively large value, to absorb a variation of the actual output torque Te depending upon the burning condition of the engine 10. Thus, it is difficult for the known arrangement to significantly reduce the extra pressure $\Delta P$ and the power loss in the CVT.

While the present invention has been described in its presently preferred embodiment, for illustrative purpose only, the invention may be otherwise embodied.

In the illustrated embodiment, the actual output torque Te of the engine 10 is calculated according to a predetermined relationship corresponding to the current burning condition of the engine 10, which relationship is selected from among four predetermined relationships corresponding to the four burning conditions of the engine 10. On the basis of the thus calculated output torque Te, the electronic control device 110 calculates the optimum pressure Popt, to which the second line pressure Pl2 is eventually regulated. However, the second line pressure Pl2 may be regulated such that the optimum pressure Popt or the basic output pressure Pmec rather than the output torque Te for calculating the optimum pressure Popt is regulated according to a predetermined relationship, based on the current burning condition of the engine 10.

While the illustrated embodiment is adapted to regulate the second line pressure Pl2 differently according to the four burning conditions of the engine 10, the regulation of the second line pressure Pl2 may be effected based on only two or three burning conditions.

In the illustrated embodiment, the burning condition of the engine 10 is determined based on: (1) the air-fuel ratio of the air-fuel mixture supplied to the engine 10; (2) the EGR rate; and (3) the operating (open or closed) position of the swirl control valve 430. However, the burning condition may be determined based on at least one of these parameters (1)-(3), when a relatively small number of burning conditions of the engine is taken into account in regulating the second line pressure Pl2.

While the illustrated embodiment employs two microcomputers, i.e., the electronic control device 440 for the engine 10 and the electronic control device 110 for the power transmitting system, the two microcomputers may be replaced by only one microcomputer capable of performing the functions of the two devices 440, 110, or may be replaced by three or more microcomputers.

While the reversing device 14 is located on the upstream side of the CVT 16 nearer to the engine 10 in the illustrated embodiment, the device 14 may be located on the downstream side of the CVT 16 remote from the engine 10.

In the illustrated embodiment, the second line pressure Pl2 regulated by the second pressure regulating valve 150 is applied to the CVT 16 through the shift control valve unit 250. However, the hydraulic control device 100 may be adapted such that the pressure Pl2 is directly applied to the second hydraulic cylinder 82 of the CVT 16.

While the second line pressure Pl2 is regulated by reducing the basic output pressure Pmec by the value Pdown in the illustrated embodiment, a pressure regulating valve may be used which generates the second line pressure Pl2 in direct response to a control signal from the electronic control device 110.

It is to be understood that the present invention may be embodied with various other changes, modifications and improvements, which may occur to those skilled in the art, without departing from the scope of the invention defined in the following claims.

What is claimed is:

1. A control apparatus in a motor vehicle having a hydraulically operated continuously variable transmission and a lean-burn internal combustion engine operable in a plurality of burning conditions, said transmission including a pair of variable-diameter pulleys, a transmission belt connecting the pair of pulleys, and a pair of hydraulic actuators for changing effective diameters of said pulleys for continuously variably changing a speed ratio of the transmission, one of said pair of hydraulic actuators receiving a belt tensioning pressure for controlling a tension of said transmission belt, said control apparatus comprising:
engine condition determining means for determining a currently established one of said plurality of the burning conditions of the lean-burn internal combustion engine; and
pressure regulating means for controlling said belt tensioning pressure based on an output torque of the engine, depending upon the currently established burning condition determined by said engine condition determining means,
wherein said engine condition determining means determines the currently established burning condition of said lean-burn internal combustion engine, based on a current speed of said engine and a current angle of opening of a throttle valve disposed in an intake pipe of the engine.

2. A control apparatus according to claim 1, wherein said lean-burn internal combustion engine has four burning conditions as said plurality of burning conditions.

3. A control apparatus according to claim 1, wherein said engine condition determining means comprises an electronic control device which determines, based on said current speed of said engine and said current angle of opening of said throttle valve, at least one of an air-fuel ratio of an air-fuel mixture supplied to the engine, an exhaust gas recirculating rate of said engine, and an operating position of a swirl control valve provided in the intake pipe of said engine, said engine condition determining means determining said currently established burning condition of said engine, based on said at least one of said air-fuel ratio, said exhaust gas recirculating rate, and said operating position of said control valve.

4. A control apparatus in a motor vehicle having a hydraulically operated continuously variable transmission and a lean-burn internal combustion engine operable in a plurality of burning conditions, said transmission including a pair of variable-diameter pulleys, a transmission belt connecting the pair of pulleys, and a pair of hydraulic actuators for changing effective diameters of said pulleys for continuously variably changing a speed ratio of the transmission, one of said pair of hydraulic actuators receiving a belt tensioning pressure for controlling a tension of said transmission belt, said control apparatus comprising:
engine condition determining means for determining a currently established one of said plurality of the burning conditions of the lean-burn internal combustion engine; and
pressure regulating means for controlling said belt tensioning pressure based on an output torque of the engine, depending upon the currently established burning condition determined by said engine condition determining means,
wherein said pressure regulating means comprises an electronic control device which calculates said output torque of the engine, according to one of a plurality of predetermined relationships between a speed of said engine and an angle of opening of a throttle valve disposed in an intake pipe of said engine, said one relationship corresponding to the currently established burning condition of the engine determined by said engine condition determining means.

5. A control apparatus according to claim 4, wherein said electronic control device calculates an optimum pressure for said belt tensioning pressure, based on at least the speed ratio of the transmission and said output torque of the engine calculated by said electronic control device.

6. A control apparatus according to claim 5, wherein said pressure regulating means further comprises a solenoid-operated valve for generating a pilot pressure, so that said pilot pressure corresponds to said optimum pressure, said pressure regulating means further comprising a pressure regulating valve for regulating said belt tensioning pressure, based on the speed ratio of the transmission, said angle of opening of said throttle valve, and said pilot pressure generated by said solenoid-operated valve.

7. A control apparatus according to claim 4, wherein said lean-burn internal combustion engine has four burning conditions as said plurality of burning conditions.

8. A control apparatus in a motor vehicle having a hydraulically operated continuously variable transmission and a lean-burn internal combustion engine operable in a plurality of burning conditions, said transmission including a pair of variable-diameter pulleys, a transmission belt connecting the pair of pulleys, and a pair of hydraulic actuators for changing effective diameters of said pulleys for continuously variably changing a speed ratio of the transmission, one of said pair of hydraulic actuators receiving a belt tensioning pressure for controlling a tension of said transmission belt, said control apparatus comprising:

engine condition determining means for determining a currently established one of said plurality of the burning conditions of the lean-burn internal combustion engine; and pressure regulating means for controlling said belt tensioning pressure based on an output torque of the engine, depending upon the currently established burning condition determined by said engine condition determining means, wherein said engine condition determining means determines said currently established burning condition of said engine, based on at least one of an air-fuel ratio of an air-fuel mixture supplied to the engine, an exhaust gas recirculating rate of said engine, and an operating position of a swirl control valve provided in an intake pipe of the engine.

9. A control apparatus according to claim 8, wherein said engine condition determining means determines said at least one of said air-fuel ratio, said exhaust gas recirculating rate and said operating position of said swirl control valve, based on a current speed of said engine and a current angle of opening of a throttle valve in said intake pipe of the engine.

10. A control apparatus according to claim 8, wherein said lean-burn internal combustion engine has four burning conditions as said plurality of burning conditions.

* * * * *